US006720905B2

(12) United States Patent
Levitan et al.

(10) Patent No.: US 6,720,905 B2
(45) Date of Patent: Apr. 13, 2004

(54) METHODS AND APPARATUS FOR DETECTING CONCEALED WEAPONS

(75) Inventors: Arthur C. Levitan, Wilton, CT (US); Lester Kosowsky, Stamford, CT (US)

(73) Assignee: Personnel Protection Technologies LLC, Wilton, CT (US)

( * ) Notice: Subject to any disclaimer, the term of this patent is extended or adjusted under 35 U.S.C. 154(b) by 2 days.

(21) Appl. No.: 10/229,761

(22) Filed: Aug. 28, 2002

(65) Prior Publication Data
US 2004/0041724 A1 Mar. 4, 2004

(51) Int. Cl.⁷ .............................................. G01S 13/86
(52) U.S. Cl. ............................ 342/22; 342/52; 342/53; 342/54; 342/90; 342/179; 342/192
(58) Field of Search ............................. 342/27, 52, 53, 342/54, 55, 90, 176, 179, 180, 191, 192, 196, 22, 42, 44, 45

(56) References Cited

U.S. PATENT DOCUMENTS

| | | | | |
|---|---|---|---|---|
| 3,707,672 A | * | 12/1972 | Miller et al. | 324/239 |
| 4,031,545 A | * | 6/1977 | Stein et al. | 378/57 |
| 4,791,427 A | | 12/1988 | Raber et al. | |
| 4,794,398 A | | 12/1988 | Raber et al. | |
| 5,552,705 A | * | 9/1996 | Keller | 324/239 |
| 6,243,036 B1 | | 6/2001 | Chadwick et al. | |
| 6,359,582 B1 | | 3/2002 | MacAleese et al. | |
| 6,480,141 B1 | * | 11/2002 | Toth et al. | 342/22 |
| 2003/0034444 A1 | * | 2/2003 | Chadwick et al. | 250/225 |
| 2003/0179126 A1 | * | 9/2003 | Jablonski et al. | 342/22 |
| 2003/0189510 A1 | * | 10/2003 | Anderton et al. | 342/22 |

OTHER PUBLICATIONS

"Image processing tools for the enhancement of concealed weapon detection", Slamani, M.–A et al; 1999. ICIP 99. Proceedings 1999 International Conference on Image Processing, Oct. 24–28 1999 Ps: 518–522 vol.3.*

"Remote concealed weapons and explosive detection on people using millimeter–wave holography", McMakin, D.L.; Sheen, D.M.; Collins, H.D.; Security Technology, 1996. 30th Annual 1996 Int'l Carnahan Conf., Oct. 2–4 1996 Ps: 19–25.*

(List continued on next page.)

Primary Examiner—John B. Sotomayor
(74) Attorney, Agent, or Firm—Straub & Pokotylo; Michael P. Straub (57) ABSTRACT

Methods and Apparatus for early detection and identification of a threat, and alerting against detected threats, such as individuals wearing or carrying explosive materials and/or weapons, e.g., suicide bombers and other terrorists, at a great enough distance to limit loss of life and destruction of property are disclosed. The methods comprise transmitting a signal in the direction of a potential threat, measuring the detected reflected signal, and comparing the signal level with a threshold indicative of a threat. A monitor is employed to display the threat and attributes of the detected signals. The invention further illuminates the suspicious individual(s) with a Laser illuminator/designator and provides information about the distance to the suspicious individual(s).

47 Claims, 6 Drawing Sheets

OTHER PUBLICATIONS

"Three-dimensional millimeter-wave imaging for concealed weapon detection", Sheen, D.M.; McMakin, D.L.; Hall, T.E.; Microwave Theory and Techniques, IEEE Transactions on , Vol: 49 Issue: 9, Sept.2001 Ps: 1581–1592.*

"Privacy algorithm for cylindrical holographic weapons surveillance system", Keller, P.E.; McMakin, D.L.; Sheen, D.M.; McKinnon, A.D.; Summet, J.W.; Proc. IEEE 33rd Annual 1999 Int'l Carnahan Conference on Security Technology, Oct. 5–7 199 Ps: 177–181.*

"Outdoor passive millimetre wave security screening", Sinclair, G.N.; Anderton, R.N.; Appleby, R.; Security Technology, 2001 IEEE 35th International Carnahan Conference on , Oct.16–19 2001 pp.: 172–179.*

"Millimetre wave aviation security scanner", Murphy, K.S.J.; Appleby, R.; Sinclair, G.; McClUmpha, A.; Tatlock, K.; Doney, R.; Hutcheson, I.; Security Technology, 2002. Proceedings. 36th Annual 2002 INt'l CarnahanConference on , Oct. 20–24 Ps: 16–166.*

P. Phillips, "Personnel and Vehicular Monitoring and Tracking at a Distance", DARPA SBIR, Topic SB022–033, pp. 1–2, downloaded from http://www.zyn.com/sbir/sbres/sbir/dod/darpa/darpasb02-2-033.htm on Jul. 2, 2002.

D. Woolard and W. Clark, "Terahertz Interferometric Imaging Systems (TIIS) for Detection of Weapons and Explosives", Army SBIR, Topic A02–061, Army Research Office (ARO), pp. 1–3, downloaded from http://www.zyn.com/sbir/sbres/sbir/dod/army/armysb02-2-061.htm on Jul. 2, 2002.

K. Kappra, "Explosive Detection System", Army SBIR, Topic A02–037, Army Research Lab (ARL), pp. 1–3, downloaded from http://www.zyn.com/sbir/sbres/sbir/dod/army/armysb02-2-037.htm on Jul. 2, 2002.

L. Malotky and S. Hyland, "Preventing Aircraft Bombings", The Bridge, v. 28, No. 3, pp. 1–6, Fall, 1998.

"Can Big Brother see right through your clothes? Beyond E–ray Vision", Discover, pp. 24–25, Jul. 2002.

Concealed Weapom Detection (Low Power Radars), AFRL/IF, pp. 1–2, downloaded from http://www.rl.af.mil/div/IFB/techtrans/datasheets/CWD–LPR. html on Aug. 13, 2002.

"Millimeter Wave/Infrared Concealed Weapons Detector", JUSTNET–NLECTC Virtual Library.

* cited by examiner

| PARAMETER | VALUE |
|---|---|
| FREQUENCY | 95 GHZ |
| WAVE LENGTH | 0.32 CENTIMETERS |
| ANTENNA GAIN | 43 DB |
| RADAR BANDWIDTH | 475 MHZ |
| NOISE FIGURE | 5 DB |
| LOSSES | 4 DB |
| PEAK TRANSMITTED POWER | 0.1 WATT |
| BEAMWIDTH | 1.15 DEGREES |
| ANTENNA DIAMETER | 19.3 CENTIMETERS |
| ANTENNA EFFICIENCY FACTOR | 55 PER CENT |
| DISTANCE TO TARGET | 100 METERS |
| HEIGHT OF TARGET | 2 METERS |

FIGURE 4

METHODS AND APPARATUS FOR DETECTING CONCEALED WEAPONS

FIELD OF THE INVENTION

The invention relates generally to the field of concealed weapon detection and, more specifically, to a system and method for isolating and identifying potential concealed weapon carriers with sufficient warning, both in time and distance, to permit successful defensive action to limit the loss of life and destruction of property.

BACKGROUND OF THE INVENTION

The suicide or homicide bomber has been identified as the one threat that is virtually unstoppable. The thinking of the bomber defies all societal norms. With that being said, the logical solution to the problem would be the development of a means for detecting the bomber at a safe distance from a potential target. To date, there are no known concealed weapons or explosive detection systems available that purport to detect a concealed weapon (or weapons) or explosive devices from a distance of more than 20 yards. Reference is made to an article in the July 2002 Discover Magazine entitled "Beyond X-ray Vision" by Ivan Amato for a recent survey of the current state of the technology. Attention is also called to an article in the fall 1998 The Bridge published by the National Academy of Sciences entitled "Preventing Aircraft Bombings" by Lyle Malotky and Sandra Hyland for additional background information on the problem to be solved.

Almost every known detection system is electromagnetic based and requires an individual to pass through a fixed passageway. When metallic objects pass through the passageway, a warning signal is activated because a change in magnetic flux is detected. This type of system either detects or does not detect a metal object and makes no determination relative to the amount of metal present. Keys, jewelry, watches, and metal-framed eyeglasses may all trigger such a system.

U.S. Pat. No. 6,359,582 describes a weapons detector and method utilizing Radar in conjunction with stored spectral signatures. The system is said to be capable of measuring the self-resonant frequencies of weaponry. It is claimed that accuracies of greater than 98% can be obtained at distances, preferably between 4–15 yards. It is also claimed to be capable of detecting metal and non-metal weapons on a human body, in purses, briefcases and under clothing and discerning from objects such as belt buckles, coins, keys, calculators and cellular phones. This system has the disadvantage of relying on the presence of unique spectral signatures, which must be pre-stored or learned by a computer employing artificial intelligence techniques.

Another patent, U.S. Pat. No. 6,243,036, titled Signal Processing for Object Detection System describes another concealed weapon detection system. The patent describes detecting concealed weapons by calculating the difference of a pair of differences between levels of different polarized reflected energy in the time domain, and by using signal processing methods and apparatus to improve the reliability of the detection process. This technique which relies on differences between levels of different polarized reflected energy is difficult and potentially costly to implement.

Information at http://www.nlectc.org/virlib/InfoDetail.asp?intinfoID=201 and http://www.rl.af.mil/div/IFB/tefchtrans/datasheets/CWD-LPR.html, indicates that Lockheed Martin, under contract to the Air Force Research Laboratories and the National Institute of Justice, is in the process of developing a dual-mode (millimeter wave/infrared) camera to detect weapons concealed on an individual. The information indicates that the system will operate at a range of 10 to 40 feet, without the control or cooperation of the individual under surveillance. The described system develops images from the returned Radar energy. The image information is processed using algorithms to automatically detect and recognize concealed weapons. The detection and position information from the Radar sensor would be linked to a second sensor IR or visual camera to display the subject to authorities.

In addition to the above discussed detection systems, there are several new initiatives being pursued under the auspices of the Small Business Innovation Research (SBIR) program in the Concealed Weapons Detection arena. The DARPA SBIR, Topic SB022-033 entitled Personnel and Vehicular Monitoring and Tracking at a Distance seeks to "develop 3D biometric technologies as part of a multi-modal system to detect, track and recognize humans . . . at a distance to support early warning, force protection, and operations against terrorist, criminal and other human based threats." The particular focus of this work is 3D imaging. The Army Research Office (ARO) SBIR Topic A02-061, Terahertz Interferometric Imaging Systems (TIIS) for Detection of Weapons and Explosives seeks to "develop and demonstrate a terahertz-frequency imaging array with sufficient spatial and spectral resolution to enable the rapid and effective detection of concealed weapons and explosives. The envisioned sensing system will provide real-time imaging with adequate sensitivity for the short-range remote interrogation of objects and persons that might be concealing either weapons or explosives" with a parallel focus on collecting "signature information for a set of expected targets and concealment materials." The Army Research Lab (ARL) SBIR, Topic A02-037, Explosive Detection System, is focused on chemical signatures of explosives. Such development programs further highlight the need for improved concealed weapon detection systems.

In view of the above discussion, it is apparent that there is a need for new or improved systems and methods for rapidly evaluating the threat potential of an individual amongst other individuals at a relatively long distance. It is desirable that at least some systems or methods be capable of being implemented without the need for complex signal processing thereby reducing implementation costs relative to many of the known systems. It is also desirable that the methods and/or apparatus provide an integrated, threat-driven solution to the threat detection problem discussed above.

SUMMARY OF THE INVENTION

The present invention is directed to systems and methods for the assessment of a community of potentially threatening individuals, determination of which, if any, is a threat, and the provision of an apparatus to spotlight the threat or threats automatically or manually.

An exemplary embodiment of a system of the present invention uses Radar advantageously equipped with an Electronic Scanning Lens Antenna to pan an environment for potential targets, measures the difference between the Radar signal level returned or reflected from an individual wearing or carrying concealed weapons and/or explosives and the expected signal level returned or reflected from an innocent individual and exploits that difference to present to an operator using an imaging system (Video Imaging Device), e.g. video camera and/or infrared technology, a real-time image of the target. In addition to indicating the threatening individual, an integral Ranging Device determines distance to the individual and superimposes the distance on the image of the individual. In addition an integral "Friend or Foe" Transmitter/Receiver provides additional data about the individual which is also superimposed on the image of the individual. In various embodiments, the System advantageously employs Laser pointer technology to illuminate the threatening individual for subsequent law enforcement action. The System advantageously presents a "picture in picture" view of each identified threatening individual as well as the overall scene.

Numerous additional features, embodiments and benefits of the methods and apparatus of the present invention are discussed below in the detailed description which follows.

DETAILED DESCRIPTION

Figure 1:
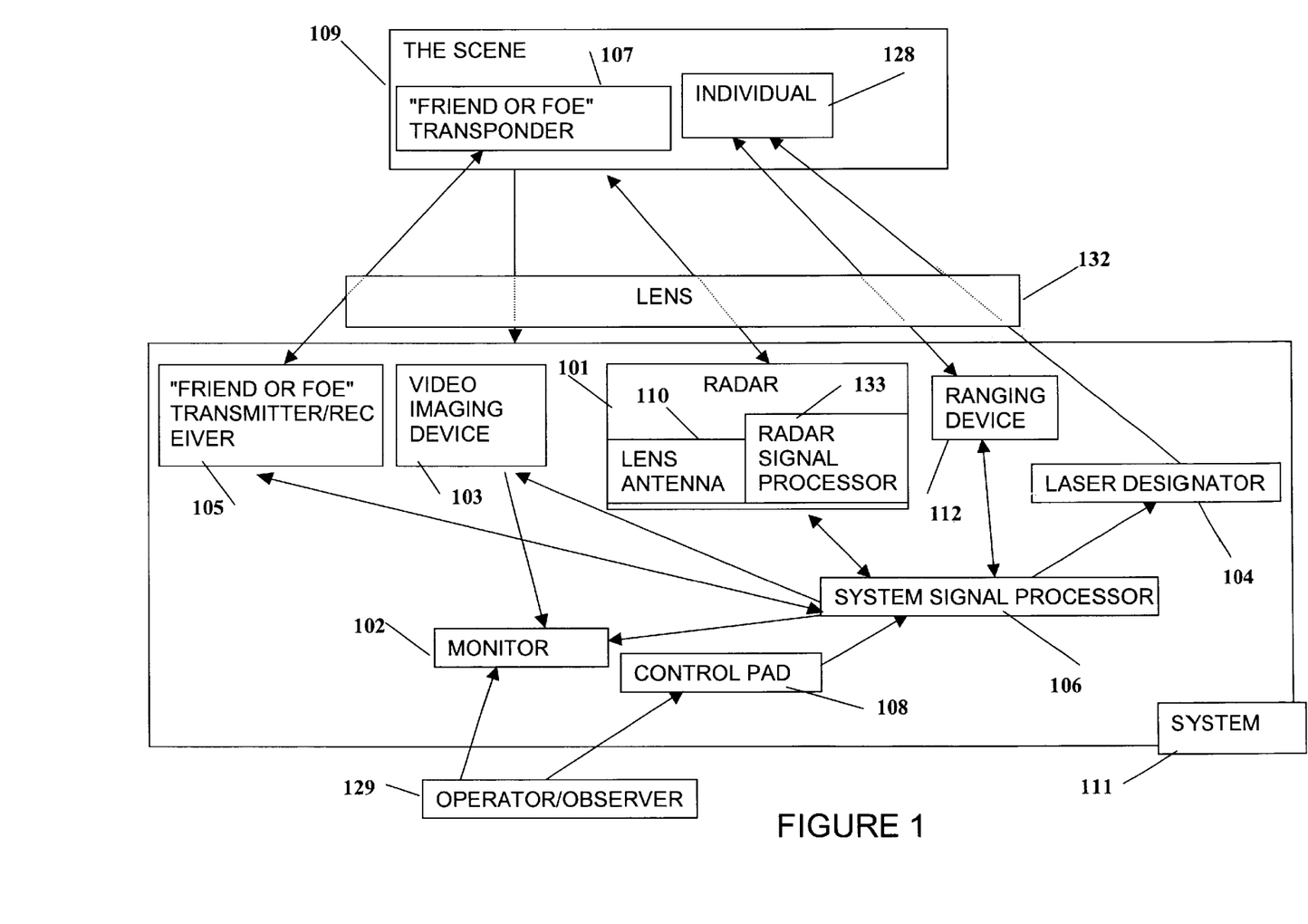
FIG. 1 illustrates an exemplary system and various signals passed between the system components in accordance with the present invention.

Referring to FIG. 1, the exemplary concealed weapon/explosive detection System 111 may advantageously be positioned more than 100 yards from the Scene 109 to be monitored. The system 11 includes various components 101, 102, 103, 104, 105, 106, 108, 110, 133 coupled together to permit the communication and/or transmission of signals and/or control information between the elements as shown in FIG. 1 through the use of arrows. Lens 132 may be incorporated into system 111 or may be a separate component, which interacts with system 111. The Operator/Observer 129 interacts through Control Pad 108 to direct System Signal Processor (SSP) 106 to control each of the operator selectable options of the System 111. The Operator/Observer 129 observes the Scene 109 by using the Monitor 102. The Control Pad 108 allows the Operator to interact with each of the elements of the System 111 through commands to the SSP 106. System 111 can, and in various embodiments does, implement an automated scanning process, without the need for a human operator. Also, the entire System 111 could be fixed-mounted, or mounted on a vehicle or other movable platform.

The SSP 106, among its other functions, advantageously processes the information received from each of the System 111 sensors (Radar 101, Video Imaging Device 103, "Friend or Foe" Transmitter/Receiver 105, Ranging Device 112) to provide near real time representation of the Scene 109 and all its calculated and determined informational tags (signal strength, distance, direction, etc).

In the preferred implementation of the subject system and method the Operator/Observer 129 advantageously decides the angular limits of the Scene 109 to be evaluated by viewing the Scene 109 on the Monitor 102 as presented by the Video Imaging Device 103 and inputting control instructions via Control Pad 108. Using the Control Pad 108, the Operator/Observer 129 causes the SSP 106 to zoom or frame-size Video Imaging Device 103 to set the angular limits of the depicted portion of Scene 109. For the purpose of this description, some activities are described as occurring sequentially, but the preferred embodiment and utilization of the subject system will beneficially exploit many of the features and scene presentations through actual or essentially simultaneous activities of the individual components.

Referring to FIGS. 1 and 2, the Radar 101 is advantageously equipped with an electronically scanned Lens Antenna 110 such as, for example, the one described more fully in U.S. Pat. No. 4,791,427 and U.S. Pat. No. 4,794,398, incorporated herein by reference in their entirety. Radar 101 rapidly and continuously pans over the Scene 109 as directed by SSP 106. The SSP 106 Radar instructions would advantageously include the lateral start and stop points to pan the selected portion of Scene 109. The Video Imaging Device 103 presents a wide-angle representation of the horizontal angular width of the selected portion of Scene 109 in response to the instructions of SSP 106, which in turn is responsive to inputs from Control Pad 108. Alternatively, the camera and monitor could utilize the infrared band, or other non-visual portion of the frequency spectrum, for use in low-light or nighttime conditions, as an example. The Radar 101, the Video Imaging Device 103, the "Friend or Foe" Transmitter/Receiver 105, the Ranging Device 112 and the Laser Designator 104 simultaneously "look through" the lens 132 portion of the Lens Antenna 110 at the Scene 109. SSP 106 advantageously causes the center of the video image presented on the Monitor 102 to correspond to the center of the scan of the Radar 101. However, the SSP 106 may either slave the Radar to scan the scene depicted on Monitor 102, as directed by Operator/Observer 129, or the Video Imaging Device 103 could be slaved to show the area being panned by the Radar 101, wherein the Operator/Observer 129 may advantageously direct the Radar 101's scanning area through manipulation of Control Pad 108, and thence SSP 106 directing Radar 101. The Radar 101 transmits its signal incrementally toward individual targets of the Scene 109 as it pans over the Scene 109, and the Radar Signal Processor 133 measures the amount of the transmitted signal that is reflected from the Scene 109 and detected by Radar 101. The Radar Signal Processor 133 sends the detected signal data to SSP 106.

FIG. 2 illustrates the appearance of the image display as it may appear on monitor 102 through the target acquisition process. The SSP 106 may advantageously calculate the average of the detected signals from Scene 109, hereinafter the Average Detected Signals 204 (of FIG. 2). Said average may be an average, e.g. of signal power or some other signal value such as a detected signal amplitude or intensity, which is a function of the detected returned signal. The average detected Radar return signal is calculated by utilizing the reflected signal data at each incremental pointing angle of Radar 101, from the leftmost to the rightmost extreme of the portion of Scene 109 being scanned. Since the Radar 101 pans over the Scene 109 at a uniform rate, the SSP 106 samples the detected reflected signal data across the scene and calculates and re-adjusts the Average Detected Signals 204 for every Radar 101 pan over the Scene 109. The SSP 106 next calculates a threshold at a pre-determined amount above the Average Detected Signals. Alternatively, the threshold could be arbitrarily selected by the user/operator. Also, a user-selected reference line could be implemented in place of Average Detected Signals 204. The SSP 106 causes the Monitor 102 to depict the Average Detected Signals 204 and the value of the threshold 201 on Monitor 102. The pre-determined amount above the Average Detected Signals 204 may be user selectable. A level of 10 times (10 dB) the Average Detected Signals is a beneficial nominal amount and is an exemplary value that can be used.

The SSP 106 causes Monitor 102 to simultaneously depict the detected signals as a varying continuum 206 superimposed on the pictured Scene 210 as well as the Average Detected Signals 204 and the threshold 201.

Figure 2A:
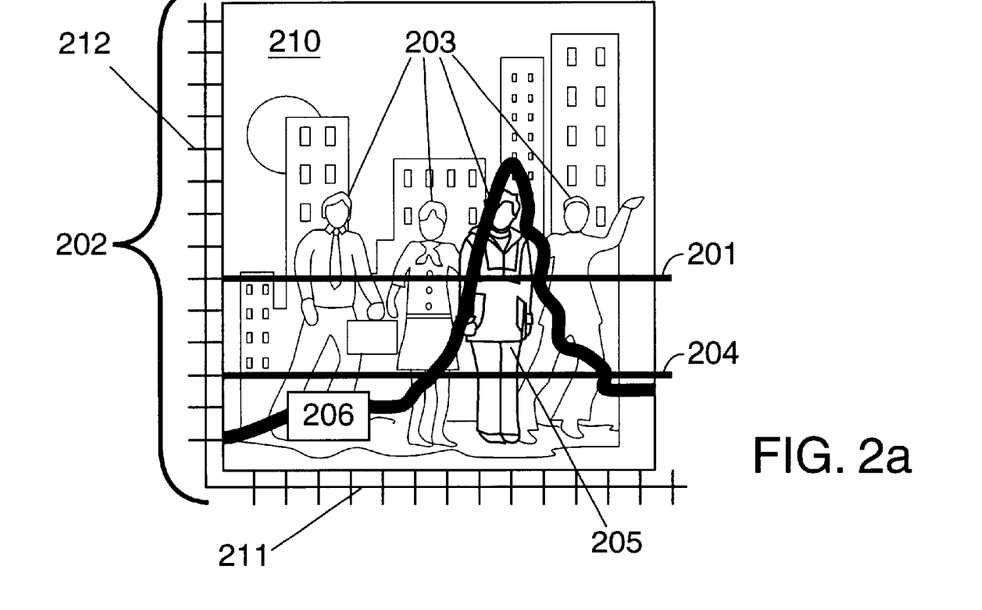
FIG. 2 illustrates the appearance of the image display on the monitor through the target acquisition process including superimposing threshold and signal strength variations on the video image.
Figure 2B:
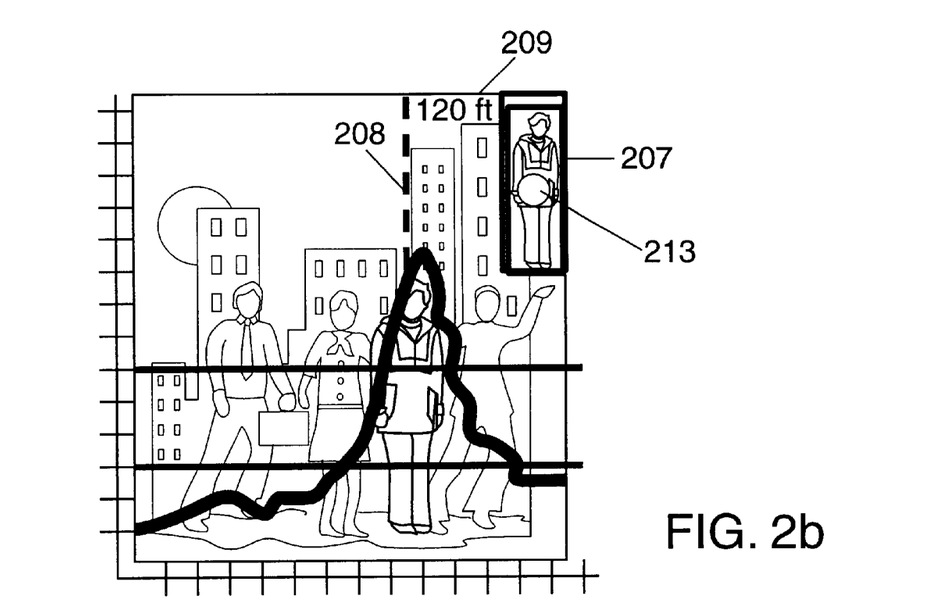

FIG. 2a represents the pictured Scene 210, which may be a portion of Scene 109 of FIG. 1, as it is presented on the Monitor 102 to the Operator/Observer 129 and which also represents the area scanned by Radar 101. At any given time, the Scene 210 includes candidate, or potential threats 203. The reflected signal data is advantageously represented on the vertical axis 212 as a level relative to the Average Detected Signals in dB. (A level higher by 3 dB represents twice as much signal; a level higher by 10 dB represents ten times as much signal). SSP 106 causes Monitor 102 to superimpose the detected signal 206 over the Individuals 203 by synching the aiming direction of Radar 101 with the associated position on horizontal axis 211 on the Monitor 102. The horizontal axis 211 is the angular limit of pictured Scene 210 as selected by the Operator/Observer 129. Whenever the detected signal 204 exceeds the threshold 201, the SSP 106 notes the Radar 101 aiming direction (the Noted Position 208 in FIG. 2b) within the scanned Scene 210. In FIG. 2B, by way of example, the detected signals 204 data reaches a peak at the Noted Position 208 at which the threat appears, and is superimposed on the image of the threatening Individual at the Noted Position 208. FIG. 2b further depicts a "picture in picture" image which is displayed by SSP 106 on Monitor 102, for each noted position, and is thereby presented to the Operator/Observer 129 on Monitor 102. The Individual at Noted Position 208 appears in the inset box 207 ("picture in picture") and the Noted Position 208 is marked on the pictured Scene 210 as directed by SSP 106. SSP 106 may also advantageously activate a visual, aural, or other alarm (not shown) at this time.

SSP 106 also uses the Noted Position 208 to cause the "Friend or Foe" Transmitter/Receiver 105 (FIG. 1) to transmit an interrogation signal in that direction. If the Individual 128 is equipped with a correctly configured "Friend or Foe" Transponder 107, e.g., one equipped with the proper response codes, the response is transmitted by "Friend or Foe" Transponder 107 to "Friend or Foe" Transmitter/Receiver 105, which will send a message indicating "Friend" to SSP 106. SSP 106 will thereupon cause Monitor 102 to superimpose the "Friend" response on the Monitor 102 at a position in the picture corresponding to the Noted Position 208. Further, the "picture in picture" could then be deactivated by SSP 106 via another Monitor 102 instruction. If the Individual is not so equipped, the SSP 106 does not receive the transponder message indicating "Friend", and thereupon directs the Laser Designator 104 to be pointed at and to illuminate the Individual 128 by aiming in correspondence to the Noted Position 208 and activating the laser beam. Alternatively, an illuminating beam of a wavelength not visible to the naked eye could be used instead of a laser, so that a viewer wearing special eye pieces, or viewing a specialized monitor screen, could see the target of the illumination, but the subject of the illumination would not know that he was being so targeted. Simultaneously with the illumination of the target, the SSP 106 sends an instruction to Ranging Device 112, causing it to obtain a distance measurement to the Individual 128, again through use of the Noted Position 208, and that distance is passed from the Ranging Device 112 to SSP 106, and SSP 106 causes Monitor 102 to display the distance measurement at the Noted Position 208, which would effectively label the target on the Monitor 102, as depicted in FIG. 2.

The Radar 101 continues to pan over the Scene 109 and the Radar 101 will re-detect and constantly update the location of a detected signal in excess of the threshold, and will automatically note the position of this signal, which will be different than the original Noted Position 208, if the target has moved. The Video Imaging Device 103 and Monitor 102 continue to present the wide-angle view of the Scene 210 and Laser Designator 104, "Friend or Foe" Transmitter/Receiver 105 and Ranging Device 112 are directed by SSP 106 to aim at the new Noted Position 208, continuously refreshing the data and image presentation at each new Noted Position 208, effectively "following" the targeted Individual 128 who caused the threshold to be exceeded. The pan rate of the Radar 101 over the Scene 109 is rapid enough to allow the light of the Laser Designator 104 to appear to the Operator/Observer 129 to be stationary on each designated Individual 128 (visual persistence). If other Individuals 128 are determined to be threats (additional signal returns from a position more than a prescribed amount from the first Noted Position 208, advantageously two feet, exceed the threshold) the SSP 106 will create an additional "picture in picture" of the additional Noted Position (not shown) on the Monitor 102, marking each threat by Laser Designator 104, and noting on Monitor 102 the Distance and video image markers at each new Noted Position.

The reflected detected signal that results from the illumination of the potential threatening individual by the narrow beam Radar is likely to be greatest when there are metal objects present. The more metal objects, the greater the signal reflected. Metal objects with corners, like nails that are used to augment the killing power of an explosive device, provide a greater signal. Metal objects that are spherical like bearings or cylindrical-like bullets, also reflect greater signals. The present invention does not require pre-stored or learned signatures. The present invention establishes a reference signal threshold (Average Detected Signals) in real time from the pictured Scene 210 and relies on the fact that the aforementioned metal or other reflective objects are likely to reflect sufficient energy to exceed that threshold whereas a few incidental metal objects carried by an innocent individual is not likely to exceed the threshold. The use of the video imaging system permits the operator to distinguish between individuals carrying weapons in the open from those carrying concealed weapons and/or explosives.

The narrow beam Radar does not have to provide range to the target nor velocity of the target allowing the Radar to be optimized for the measurement of signal returned from the target. Several techniques well known to those skilled in the art can, and in various embodiments are, used to augment the signal return. Examples of such techniques include circular polarization and multi-frequency transmissions. The Radar beam must be narrow enough to be able to isolate an individual from other individuals, but wide enough to encompass the whole individual. Dependent upon scenarios presented by the user community, the parameter specifications for the Radar will be determined. The signal strength returned from the target is proportional to the size of the antenna, the frequency of the Radar, the power transmitted as well as the distance to the target and the reflectance of the target. Various features of the present invention are directed to one or more of the following long range detection of the threat, minimal signal processing, self-calibration, no requirement that the system be re-trained for each new weapon or configuration, low cost, light weight and simplicity of operation (including both manual and automatic modes).

Figures 3, 3A:
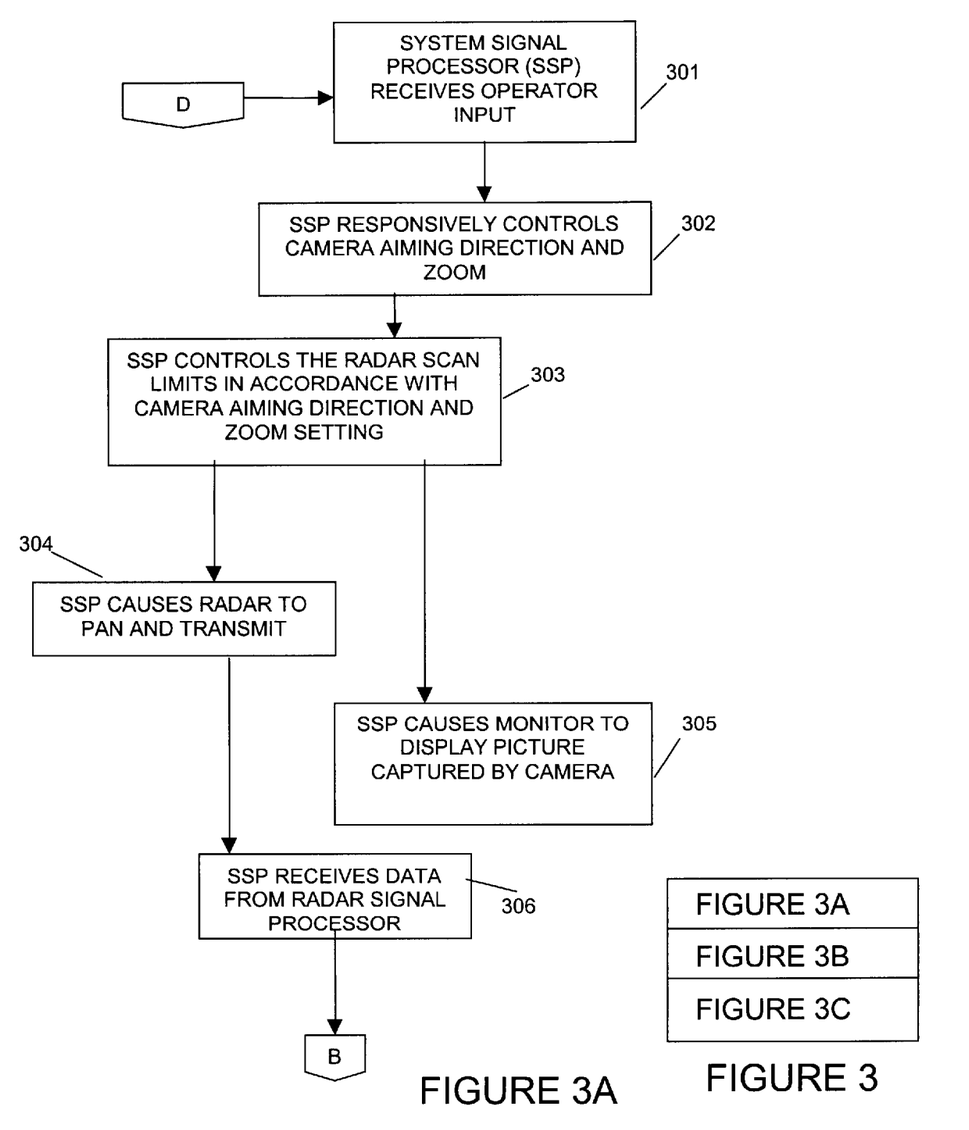
FIG. 3, which comprises the combination of FIGS. 3a through 3c, is a flow chart illustrating steps performed by a System Signal Processor in accordance with the method of the present invention.
Figure 3B:
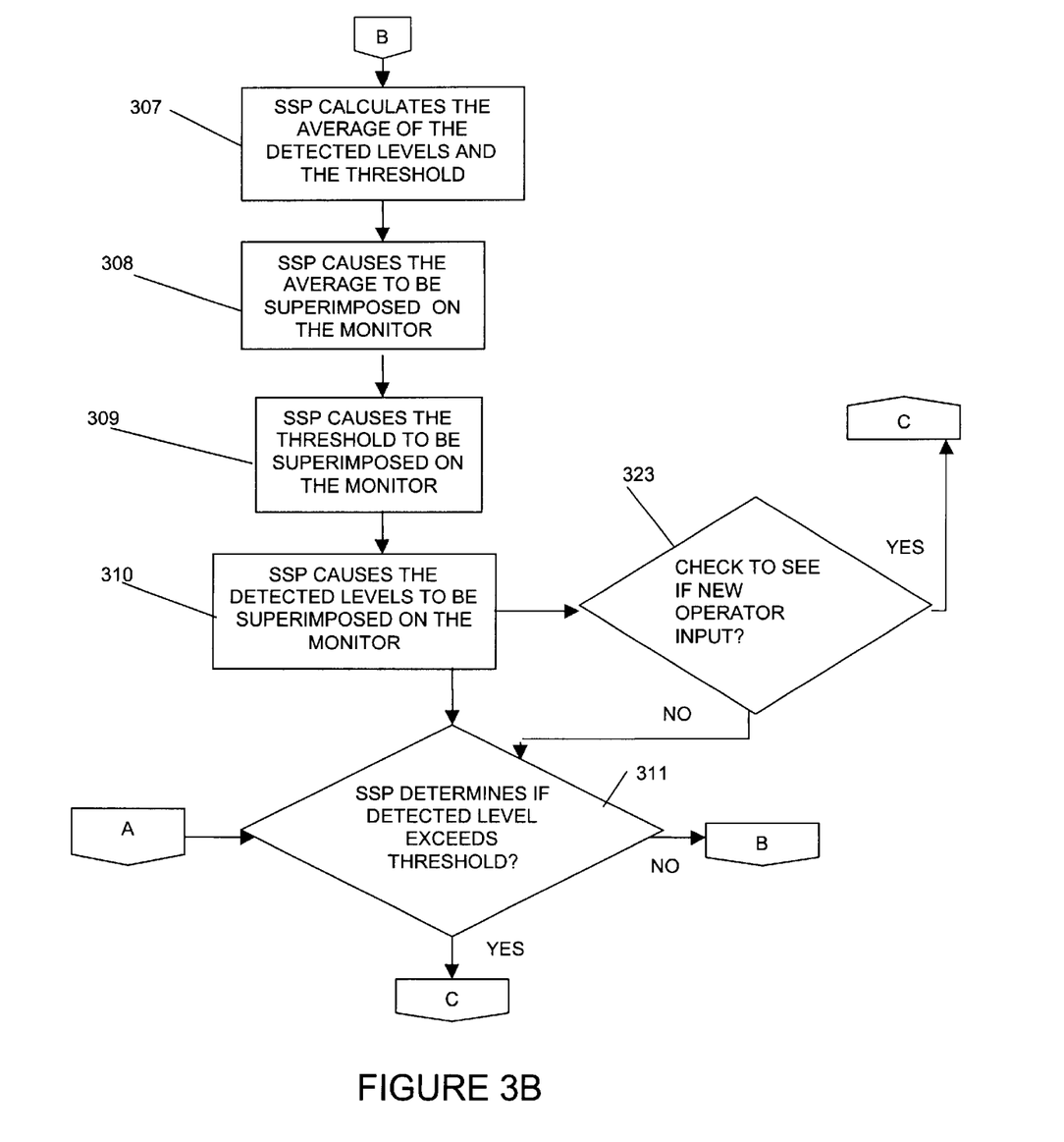
Figure 3C:
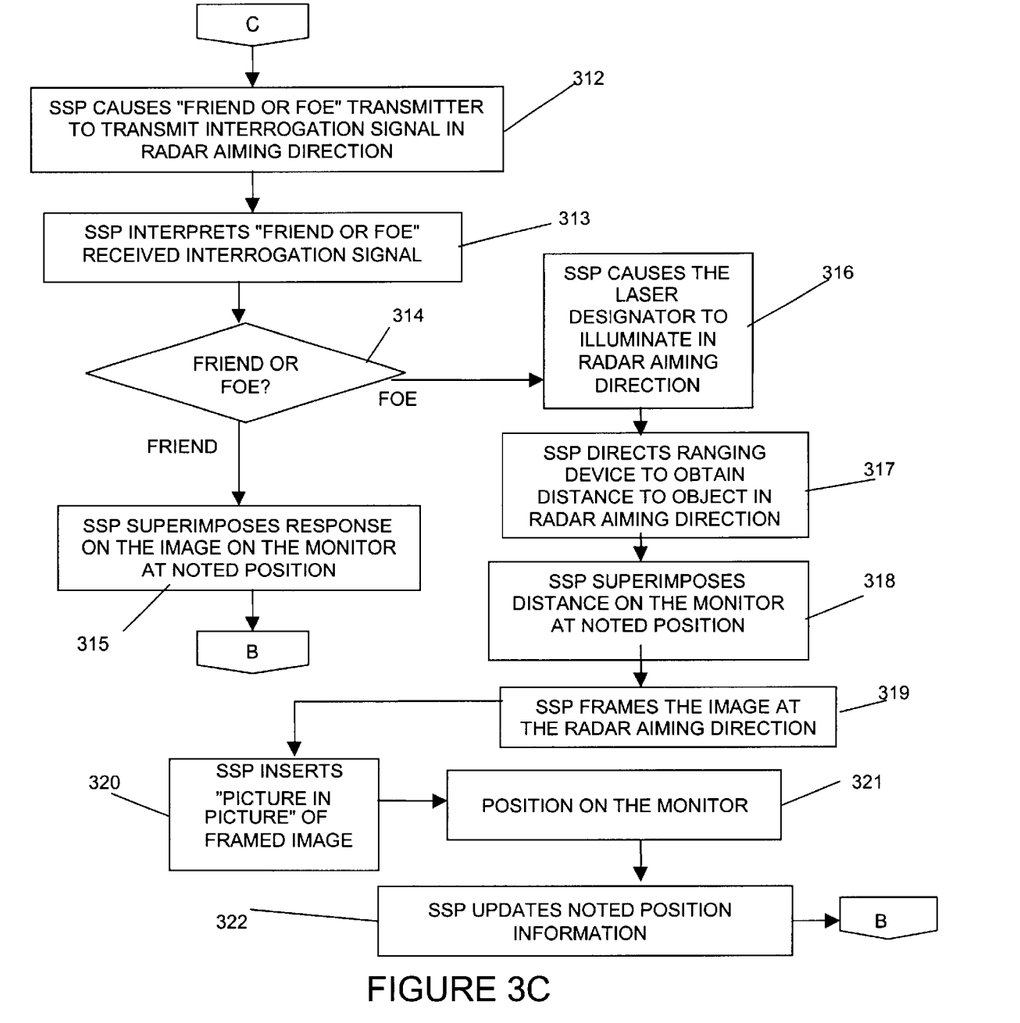

FIG. 3 which comprises the combination of FIGS. 3a, 3b and 3c, illustrates the System Signal Processor (SSP) process flow of the invention. Referring to FIG. 3a, the SSP receives input from the operator at step 301, and in response to the input, controls the camera aiming direction and the size of the photographed scene (zoom) in step 302. The SSP then causes the Radar scan limits to be in accordance with the camera's aiming direction and zoom setting in step 303. In steps 304 and 305, the SSP causes the Radar to pan according to the scan limits and transmit a continuous signal, and causes the Monitor to display the picture as photographed by the camera. The SSP receives the detected signal data from the Radar in step 306.

Referring to FIG. 3b, the SSP next calculates the average of the received detected levels and the threshold in step 307, and in steps 308 and 309 causes the average and the threshold to be superimposed on the Monitor, advantageously as straight horizontal lines. In step 310, the SSP causes the detected levels to be superimposed on the Monitor, corresponding to the Radar aiming direction at the time of each detected level, advantageously as a curved line or as a plurality of short connected lines. In step 323, the SSP checks to see if new operator input had been received, and if so, returns to step 301. If not, it proceeds to step 311, wherein it determines if the detected level exceeded the threshold. If not, it returns to step 307. If so, it proceeds to step 312.

Referring to FIG. 3c, in step 312, the SSP causes the "Friend or Foe" transmitter to transmit an interrogation signal in the direction that the Radar was presently aimed corresponding to the Noted Position, and in step 313 the SSP receives the response signal (if any) from the transmitter. In step 314, the SSP determines whether there was a pre-determined "Friend" response, and if so, classifies the target as "Friend" and proceeds to step 315, where the SSP superimposes the "Friend" response on the Monitor at the Noted Position corresponding to the time of the threshold being exceeded and then returns to step 307.

If the pre-determined "Friend" response is not detected in step 314, the SSP next causes the laser to illuminate in the Radar aiming direction corresponding to the Noted Position at step 316. The SSP also causes the Ranging Device to obtain the distance to the object in the Radar aiming direction in step 317, and in step 318 superimpose that distance on the Monitor at the Noted Position. Next, the SSP frames the image at approximately the size of a human at the Noted Position and in step 320 insert that framed image as a "picture in picture" in a corner of the Monitor. Simultaneously, the SSP marks the Noted Position on the primary display of the Monitor at step 321. Then in step 322 the SSP updates the Noted Position information. In step 322, if another detected signal exceeds the threshold near the Noted Position, the SSP would replace the old Noted Position with the subsequent Noted Position. If the next Noted Position is not near the first Noted Position, then the SSP would treat that next Noted Position as an additional Noted Position on the Monitor, including using an additional picture in picture for that Noted Position. From step 322 the SSP returns to step 307

Figure 4:
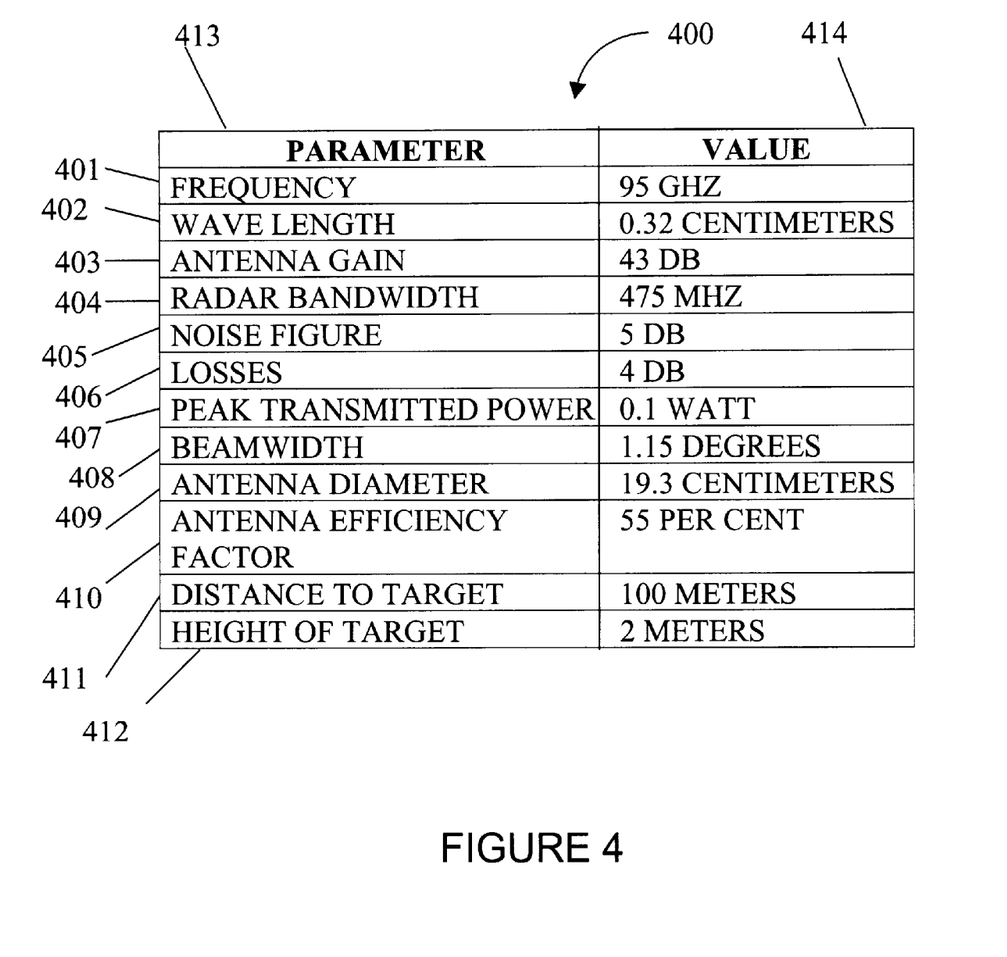
FIG. 4 illustrates a typical set of parameters used to implement a system in accordance with the invention.

FIG. 4 illustrates an exemplary set 400 of design parameters. Parameters 413 and corresponding exemplary values 414 are illustrated in the left and right columns, respectively. The exemplary values were selected with practical considerations in mind. Such considerations include the availability of components, acceptable operating frequencies, an antenna size that is manageable, beamwidths that are narrow enough to pinpoint the target, power levels that are safe, etc. The frequency, 95 Ghz 401, f, is selected from the historical possibilities that were initially determined by analysis to be least affected by atmospheric conditions. The frequency should be high enough for the resultant antenna size to be small enough to be portable and narrow-beamed to encompass a man-size target. In other embodiments for fixed installation, i.e., not portable, or different design distances, different frequencies can be chosen. Since this class of frequencies has been used extensively, components are widely available. The wavelength, 402, $\lambda$, is calculated from the frequency. The antenna gain 403, G, is derived from size of the antenna 409, which is based on the beamwidth 408, $\alpha$, selected to encompass the target. The antenna efficiency factor 410, $\eta$, is based on the electric field distribution over the antenna and the total radiation efficiency associated with various losses, including spillover, ohmic heating, phase nonuniformity, blockage, surface roughness, etc. and is typically equal to 55 percent. The Radar receiver bandwidth 404, B, is advantageously selected to be 475 MHz or 0.5 percent and is a design parameter. It is defined as the frequency spread around the center frequency where the receiver response to an input no more than half that at the peak center frequency. Noise Figure 405, $N_F$, is a measure of the sensitivity of the Radar Receiver and is a design parameter. For an inexpensive receiver a Noise Figure of 5 dB is assumed. The Losses 406, $L_T$, is defined as the loss between the transmitter and antenna, receiver and antenna and other unexplained losses. A good "catch-all" value that has empirical basis is 4 dB. The Peak Transmitted Power 407, $P_T$, advantageously at 0.1 watt is selected to be as low as practicable to minimize unnecessary exposure of the innocent population and is a design parameter. The distance to the target 411 is advantageously selected to be 100 meters and is a design parameter, which in conjunction with the height of the anticipated target 412 of 2 meters drives much of the Radar design.

The calculation of the signal strength and the signal strength dependencies as set forth below describe how the exemplary set of design parameters of FIG. 4 determine the performance of the system and how some of the design parameters are determined from the exemplary system requirements. The energy reflected from a target competes with background noise from many sources. The Radar Range Equation rearranged to calculate Signal to Noise Ratio $$\frac{P_T G^2 \lambda^2 \sigma}{(4\pi)^3 R^4 K T_0 B N_F L_T}$$

explains the ability of Radar to detect a target. The signal to noise ratio is directly proportional to the Transmitted Power 407, $P_T$, the square of the Antenna Gain 403, G, the square of the Wavelength 402, $\lambda$, and the Radar Cross Section of the target, $\sigma$, and inversely proportional to the fourth power of the Distance to the target 411, R, the Bandwidth of the Receiver 404, B, the Noise Figure 405, $N_F$, and miscellaneous Losses 406, $L_T$. The calculation of the Signal to Noise Ratio for an embodiment of the subject invention as beneficially described by the result of substituting the parameters of FIG. 4 in the above described Radar Range Equation is 3.6 dB or 2.3 times more than the noise present in the system. Since the target for the subject invention is an individual, the length of the arc at a distance to the target should encompass the height of an individual. Assuming an exemplary 2 meter tall individual, the calculation determines the resultant angle or beamwidth to be 1.15 degrees, for an exemplary distance to the individual of 100 meters. The beamwidth determines the diameter of the antenna at the exemplary frequency of 95 GHz to be 0.193 meters based on the relationship understood by those skilled in the art to be Diameter, D, equals a constant factor, typically 1.22, times the speed of light, c, and divided by the product of the beamwidth and the frequency, f, beneficially represented as $$D = \frac{1.22(c)}{(f)(Beamwidth)}$$

The Gain of the antenna, G, given the exemplary frequency of 95 GHz, a Diameter, D, of 0.193 meters, is determined based on the relationship understood by those skilled in the art to be equal to an antenna efficiency factor, η, typically 55%, times the product of the parameter pi, π, the antenna diameter, D, times the frequency, f, divided by the speed of light, c, all to the second power beneficially represented as $$G = \eta(\pi D f/c)^2$$

It should be noted that a pointing accuracy of one-tenth the beamwidth is a reasonable expectation.

Another objective of the invention is to permit remote deployment, periphery protection, automated threat assessment and declaration of threat.

While the invention has been particularly shown and described with reference to the preferred embodiments thereof, it will be understood by those skilled in the art that various changes in form and detail, including tradeoffs of Radar design parameter selection, may be made therein without departing from the spirit and scope of the invention.

What is claimed is:

1. A system for detecting a threat, the system comprising:
   a transmitter that transmits a signal in each of a plurality of different aiming directions to pan a scene including a potential threat;
   a detector associated with the transmitter which detects a reflected portion of the signal;
   a processor associated with the detector; and
   a display associated with the processor which displays a visual depiction of said scene that includes the potential threat,
   wherein the processor causes the display to indicate the segment of the visual depiction which is aligned with the aiming direction of the transmitter when the detected signal exceeds a threshold.

2. The system of claim 1, further comprising:
   an alarm associated with the processor which is activated when the detected signal exceeds a threshold.

3. The system of claim 1, further comprising:
   a camera associated with the display for capturing the visual depiction.

4. The system of claim 3, wherein the camera detects energy outside the visible spectrum.

5. The system of claim 1, wherein the processor causes the transmitter to pan the displayed scene.

6. The system of claim 1, wherein the processor causes the transmitter to pan a designated area, and causes the visual depiction to include the designated area.

7. The system of claim 5, wherein the detected signal is depicted on the display indicative of the aiming direction of the transmitter.

8. The system of claim 5, wherein the threshold is depicted on the display.

9. The system of claim 5, wherein the direction of each detected signal that exceeds the threshold is depicted on the display.

10. The system of claim 1, wherein the display additionally depicts the segment in a picture-in-picture window.

11. The system of claim 10, wherein when a second detected signal exceeds the threshold, a second picture-in-picture window is additionally depicted.

12. The method of claim 1, wherein said scene is an outdoor scene.

13. The method of claim 12, wherein said scene includes multiple buildings.

14. The method of claim 12, wherein said scene includes multiple individuals.

15. A method for detecting a threat, the method comprising:
    i) transmitting a signal in each of a plurality of different aiming directions to pan a scene including a potential threat;
    ii) detecting a reflected portion of the signal;
    iii) displaying a visual depiction of said scene that includes the potential threat; and
    iv) indicating on the depiction the aiming direction of the transmitter when the detected signal exceeds a threshold.

16. The method of claim 15, wherein the depiction is generated from energy outside the visible spectrum.

17. The method of claim 15, wherein said scene is an outdoor scene.

18. The method of claim 17, wherein said scene includes multiple buildings.

19. The method of claim 18, wherein said scene includes multiple individuals.

20. A system for detecting a threat, the system comprising:
    a transmitter that transmits a signal in each of a plurality of different directions to pan a scene including a potential threat;
    a detector associated with the transmitter which detects a portion of the signal that is reflected;
    a processor associated with the detector; and
    an illuminator associated with the processor;
    wherein the processor causes the illuminator to illuminate a portion of said scene located in the aiming direction of the transmitter when the detected signal exceeds a threshold.

21. The system of claim 20, further comprising:
    an alarm associated with the processor which is activated when the detected signal exceeds a threshold.

22. The system of claim 20, wherein the illuminator is activated for each detected signal that exceeds the threshold.

23. The system of claim 20,
    wherein said transmitter is a radar transmitter; and
    wherein the illuminator aiming direction is slaved to the radar transmitter aiming direction until the detected signal exceeds the threshold, at which time the illuminator aiming direction is fixed.

24. The system of claim 20, wherein the illuminator is a laser.

25. The system of claim 20, wherein the illuminator transmits a beam which is not visible to the naked eye.

26. A method for detecting a threat, the method comprising:

i) transmitting a signal in each of a plurality of different aiming directions to pan a scene including a potential threat;

ii) detecting a portion of the signal that is reflected; and iii) illuminating a portion of said scene in the aiming direction of the transmitter when the detected signal exceeds a threshold.

27. The method of claim 26, wherein the illuminator transmits a beam that is not visible to the naked eye.

28. A system for detecting a threat, the system comprising:

a transmitter that transmits a signal in each of a plurality of different aiming directions to pan a physical environment including a potential threat;

a detector associated with the transmitter which detects a portion of the signal that is reflected;

a processor associated with the detector; and an indicator associated with the processor, wherein the processor causes the indicator to indicate the aiming direction of the transmitter in a real-time view of the physical environment including the potential threat when the detected signal exceeds a threshold.

29. The system of claim 28 wherein the transmitter is a radar transmitter.

30. The system of claim 28 wherein the potential threats are ground-based.

31. The system of claim 29, further comprising an interrogator associated with the processor, wherein the interrogator transmits an interrogation signal in the aiming direction of the transmitter and determines whether a pre-arranged response transmission is received.

32. The system of claim 31, wherein the pre-arranged response transmission is a friend transponder transmission.

33. The system of claim 32, wherein the response is a pre-arranged signature modulation transmission.

34. The system of claim 31, wherein the indicator includes an indication of whether the response is received.

35. The system of claim 29, further comprising a distance measuring device associated with the processor, and wherein the distance measuring device measures the distance to an object in the aiming direction of the transmitter.

36. The system of claim 35, wherein the indicator includes an indication of the distance to the target.

37. The system of claim 29, wherein the radar transmitter includes a lens antenna with an associated integral random and scanning system.

38. A method for detecting a threat, the method comprising:

i) transmitting a signal in each of a plurality of different directions to pan a physical environment including a potential threat;

ii) detecting a portion of the signal that is reflected; and iii) indicating the aiming direction of the transmitter in a real-time view of the physical environment including the potential threat when the detected signal exceeds a threshold.

39. The method of claim 38, further comprising transmitting an interrogation signal, and determining whether a pre-arranged response transmission is received.

40. The method of claim 38, further comprising measuring the distance to the potential threat when the detected signal exceeds a threshold.

41. A system for detecting a threat, the system comprising:

a transmitter that transmits signals in each of a plurality of different directions to pan an area including several targets, a detector associated with the transmitter which detects reflected portions of the transmitted signals, and a processor associated with the detector, wherein the processor calculates a threshold as a function of an average generated from said detected signals reflected by the panned area, and identifies an aiming direction of the transmitter when a detected signal exceeds the threshold.

42. A method for detecting a threat, the method comprising:

i) operating a transmitter to transmit signals in each of a plurality of different directions to pan an area including several targets;

ii) operating a detector to detect reflected signals during an analysis period; and iii) determining a threat threshold for the analysis period as a function of the intensity of the reflected signals from the panned area detected during the analysis period.

43. The method of claim 42, further comprising:

repeating steps (i), (ii) and (iii) for each of a plurality of different analysis periods.

44. The method of claim 42, wherein step (iii) of determining a threat threshold includes:

calculating the average intensity of the detected signals; and calculating the threat threshold based on the average.

45. The method of claim 43, further comprising:

identifying the direction of a potential threat as a function of an aiming direction of the transmitter at a time during which the detected signal exceeds the threshold.

46. The method of claim 45, further comprising;

illuminating a potential threat in the identified direction.

47. The method of claim 45, further comprising:

displaying a real-time depiction in the identified direction.

* * * * *